United States Patent
Rey-Fabret et al.

(10) Patent No.: US 7,177,787 B2
(45) Date of Patent: Feb. 13, 2007

(54) METHOD FOR MODELLING HYDRODYNAMIC CHARACTERISTICS OF MULTIPHASE FLOWS USING NEURONAL NETWORKS

(75) Inventors: Isabelle Rey-Fabret, Versailles (FR); Véronique Henriot, Rueil Malmaison (FR); Quang-Huy Tran, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 65 days.

(21) Appl. No.: 10/538,089

(22) PCT Filed: Dec. 3, 2003

(86) PCT No.: PCT/FR03/03583

§ 371 (c)(1),
(2), (4) Date: Jun. 8, 2005

(87) PCT Pub. No.: WO2004/063983

PCT Pub. Date: Jul. 29, 2004

(65) Prior Publication Data

US 2006/0025975 A1    Feb. 2, 2006

(30) Foreign Application Priority Data

Dec. 10, 2002    (FR) .................................. 02 15570

(51) Int. Cl.
*G06G 7/48*    (2006.01)
*G06G 7/50*    (2006.01)
*G06G 7/57*    (2006.01)
*G06F 15/18*   (2006.01)
*G06F 15/00*   (2006.01)
*G06N 3/08*    (2006.01)
*G06N 3/02*    (2006.01)
*G06N 3/00*    (2006.01)
*G06N 3/10*    (2006.01)

(52) U.S. Cl. .................. 703/9; 703/6; 706/25; 706/26; 706/44

(58) Field of Classification Search ............... 703/9, 703/6; 706/25, 26, 44
See application file for complete search history.

(56) References Cited

U.S. PATENT DOCUMENTS

| | | | |
|---|---|---|---|
| 5,550,761 A * | 8/1996 | Pauchon et al. ............... | 703/9 |
| 6,028,992 A * | 2/2000 | Henriot et al. ................ | 703/9 |
| 6,208,983 B1 | 3/2001 | Parra et al. | |
| 2002/0016701 A1* | 2/2002 | Duret et al. ................... | 703/9 |
| 2002/0082815 A1* | 6/2002 | Rey-Fabret et al. .......... | 703/9 |

FOREIGN PATENT DOCUMENTS

EP    1 217 474 A1    6/2002

OTHER PUBLICATIONS

Mi et al., "Flow regime identification methodology with neural networks and two-phase flow models", 2001, Nuclear Engineering and Design 204, pp. 87-100.*
Ashforth-Frost et al. "The role of neural networks in fluid mechanics and heat transfer", 1995, IEEE, pp. 6-9.*
Peter Walter, et al., "3D Object Recognition With A Specialized Mixtures of Experts Architecture", 1999 IEEE, pp. 3563-3568.
Lin-Cheng Wang, et al., "A Modular Neural Network Vector Predictor For Predictive VQ", 1996 IEEE, pp. 431-434.
Mirai Tabuse, et al., "Recurrent Neural Network Using Mixture of Experts for Time Series Processing", 1997 IEEE, pp. 536-541.

* cited by examiner

*Primary Examiner*—Kamini Shah
*Assistant Examiner*—Suzanne Lo
(74) *Attorney, Agent, or Firm*—Antonelli, Terry, Stout and Kraus, LLP.

(57) ABSTRACT

Method intended for real-time modelling, by neural networks, of hydrodynamic characteristics of multiphase flows in transient phase in pipes. In order to specifically take account of the possible flow regimes of fluids in pipes, various neural or "expert" models are formed for several flow regimes (or subregimes) in the whole of the variation range of the hydrodynamic characteristics of the flows (preferably for each one of them), as well as a neural model estimating the probability of belonging of the flows to each flow regime or subregime, knowing some of the characteristics thereof. The probabilities obtained are used for weighting the estimations delivered by each neural model, the result of the weighted sum being then the estimation eventually retained. Applications to various industries and notably for modelling of hydrocarbon flows in pipelines.

4 Claims, 1 Drawing Sheet

METHOD FOR MODELLING HYDRODYNAMIC CHARACTERISTICS OF MULTIPHASE FLOWS USING NEURONAL NETWORKS

FIELD OF THE INVENTION

The present invention relates to a method intended for real-time modelling, by neural networks, of hydrodynamic characteristics of multiphase flows in transient phase in pipes.

The method finds applications notably for modelling of hydrocarbon flows in pipelines.

BACKGROUND OF THE INVENTION

Transporting hydrocarbons from production sites to treating plants constitutes an important link in the petroleum chain. It is a delicate link because of the complex interactions between the phases forming the transported effluents. The basic objective for operators is to reach an optimum productivity under the best safety conditions. They therefore have to control as best they can the velocity and the temperature so as to avoid unnecessary pressure drops, unwanted deposits and unsteady-state flows. The method that is generally used consists in modelling in the best possible way the transportation of complex multiphase streams so as to provide at all times an image of the flows in the various parts of the production chain, taking into account the precise constitution of the effluent, the flow rates, the pressures and the flow regimes.

There are currently various software tools for simulating the transport of complex multiphase streams, allowing to design suitable production equipments at an early stage.

Patents U.S. Pat. No. 5,550,761, FR-2,756,044 (U.S. Pat. No. 6,028,992) and FR-2,756,045 (U.S. Pat. No. 5,960,187) filed by the applicant notably describe modelling methods and tools allowing to simulate the transport of complex multiphase streams on steady or transient flow and capable of taking into account instability phenomena that occur because of the irregular geometry of the formation crossed by the pipe or of the topography thereof, referred to by specialists as <<terrain slugging >> or <<severe slugging >>.

The simulation tools are as complex as the modelled phenomena. Precision and performances can only be obtained after a relatively long modelling time, which is not really compatible with real-time management.

Another approach allowing, alone or in parallel with the above modelling methods, real-time management of the parameters of a fluid circulation uses neural networks.

It can be reminded that neural networks define a data processing mode simulating the functioning of biological neural systems. In such networks, an element carries out a relatively simple calculation such as a weighted sum of the signals present at its inputs applied to a non-linear function, which determines the state of the output thereof. A large number of such elements, interconnected in series and in parallel, is used. Suitable selection of the weighting factors allows the network to carry out complex functions. Networks known as retropropagation networks for example use multiple layers of elements as defined above. Adaptation of such a network to a precise task is carried out by "training" the network on a certain number of examples and by adjusting the weighting factors for each element to the suitable values. Input values are presented to the network, the output value produced by the network is analysed and the weighting factors are modified so as to minimize in the best possible way the difference between the effective value at the output and the value expected in the example selected. After sufficient training, the network is suited to respond to new input values for which the output value is not known a priori and to produce a suitable output value. In its principle, a neural network works according to a non-linear regression method which is all the more effective in relation to conventional methods. Two network types can be used, mainly MLP (Multi Layer Perceptron) networks, or Kohonen networks, well-known to specialists.

Patent EP-1,176,481 filed by the applicant describes a method intended for real-time estimation of the flow regime, at any point of a pipe whose structure is defined by a certain number of structure and physical parameters, of a multiphase fluid stream defined by several physical quantities and comprising liquid and gas phases. According to this method, the flow regime is modelled by forming a non-linear neural network with an input layer having as many inputs as there are structure parameters and physical quantities, an output layer with as many outputs as there are quantities necessary for estimation of the flow regime, and at least one intermediate layer, by forming a learning base with predetermined tables connecting various values obtained for the output data to the corresponding values of the input data, and by determining, by iterations, weighting factors of the activation function allowing to properly connect the values in the input and output data tables.

Output data of the neurons is preferably analysed so as to sort, among the values of the output data of the neural network, only the pertinent data to be taken into account for iterative determination of the weighting coefficients of the activation function.

Patent EP-1,217,474 also filed by the applicant describes a method allowing to construct a module (hydrodynamic or thermodynamic for example) that it is best suited to fixed operating conditions depending on the structure of the pipe and on a set of determined physical quantities (hydrodynamic or thermodynamic quantities for example), with fixed variation ranges for the parameters and the physical quantities. The learning base is adapted to the imposed operating conditions and optimized neural networks best adjusted to the imposed operating conditions are generated. In the case, for example, where the module is to be integrated in a general multiphase flow simulation model, both hydrodynamic and thermodynamic, the model is used to form the learning base so as to select the set of physical quantities that is best suited to the operation of the model, as well as the variation ranges fixed for said parameters and said physical quantities, and the optimized neural networks that best adjust to the learning base formed are generated.

In the aforementioned prior methods, the flows are considered in a global way, without distinction between the various possible flow regimes of the fluids in the pipe: stratified flow, dispersed flow, intermittent flow, whose behaviours are different. This can lead to modelling errors that are too great in relation to the estimation quality required for production monitoring. Furthermore, they do not take account of the existence of simple models (for example analytic models) translating in mathematical form characteristics of one or more flow regimes.

SUMMARY OF THE INVENTION

The object of the method according to the invention is the construction of a model for real-time simulation of the hydrodynamic behaviour of a multiphase fluid flow in transient phase in a pipe, considering fixed operating conditions concerning a certain number of determined structure parameters relative to the pipe and a set of determined physical quantities, with fixed variation ranges for said parameters and said physical quantities. Neural networks are used with inputs for structure parameters and physical quantities, and outputs where results necessary for estimation of the hydrodynamic behaviour are available, and at least one intermediate layer, the neural networks being determined iteratively so as to adjust to the values of a learning base with predetermined tables connecting different values obtained for the output data to the corresponding values of the input data.

The method comprises:
  constructing several neural networks respectively dedicated to different fluid flow regimes,
  constructing a probability neural network suited to evaluate at all times the probabilities for the flow in the pipe to correspond respectively to the various flow regimes, and
  combining the results provided by the various neural networks weighted by said probabilities.

According to an implementation example, the method comprises constructing at least three neural networks respectively dedicated to the stratified flow regime, the dispersed flow regime and the intermittent flow regime, evaluating the probabilities for the fluid flow in the pipe to correspond respectively to the three flow regimes and linearly combining the results at the outputs of the three dedicated neural networks by weighting them by said probabilities.

When the available database is sufficiently detailed to distinguish subregimes within a single flow regime, a probability neural network ($RN_{Proba}$) suited to evaluate at any time the probabilities for the flow in the pipe to correspond respectively to the various flow subregimes distinguished in the various flow regimes is constructed and the results provided by the various neural networks are combined by weighting them by said probabilities.

The estimation results obtained are all the more accurate as:
  a neural model is developed by flow regime or subregime, which allows to take account of the particularities of the physics contained in each one of the laws represented, and
  the continuous and derivable (in the mathematical sense) connection allowing transition between the various laws is created by a specific neural or expert network.

Besides, the method retains the capacity of the aforementioned methods for performing real-time simulation of the flows, and the results obtained benefit from the regularity of the estimation function obtained.

BRIEF DESCRIPTION OF THE FIGURES

Other features and advantages of the method according to the invention will be clear from reading the description hereafter of a non-limitative embodiment example, with reference to the accompanying drawings wherein.

DETAILED DESCRIPTION

Figure 1:
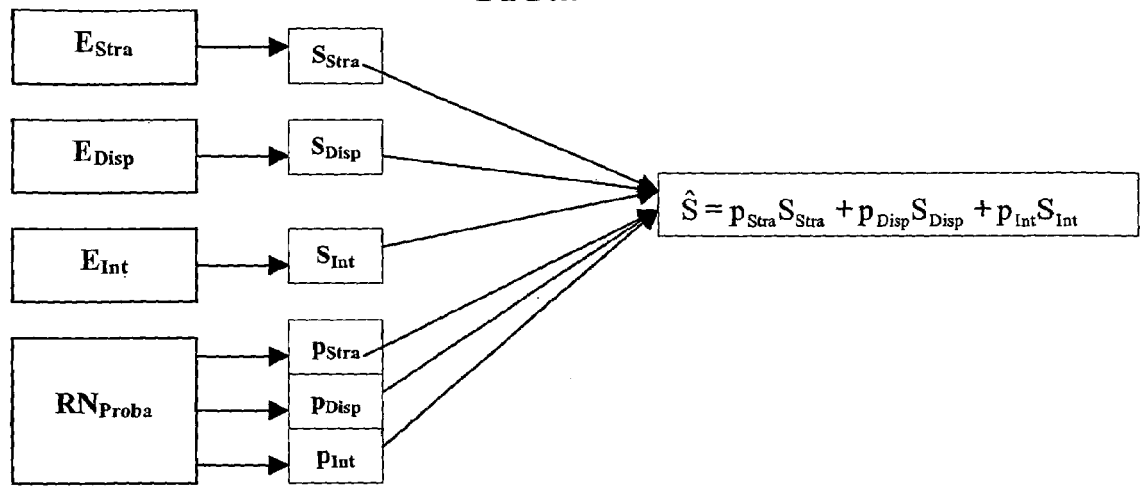
FIG. 1 shows a model structure example.

We consider a circulation of multiphase fluids in a pipe with at least a liquid phase and at least a gas phase, and we try to construct a model allowing, from a certain number of geometrical and physical input data relative to the pipe and of physical data relative to the fluids, to give instantly, for each section of the fluid stream, an estimation of the flow regime. We therefore use, as mentioned above, for a given quantity S (FIG. 1), various neural networks specifically suited to various flow regimes $N_{flows}$ in the pipe. We construct for example an expert network $E_{Stra}$ modelling specifically the stratified flows, another one, $E_{Int}$, modelling specifically the intermittent flows and a third one, $E_{Disp}$, modelling specifically the dispersed flows. We also construct a neural model $RN_{Proba}$ specifically intended to evaluate at any time the probability $p_{Stra}$, $p_{Int}$ and $p_{Disp}$. If $S_{Stra}$, $S_{Int}$, and $S_{Disp}$ are respectively the output values of the three experts, we then construct an evaluation function $\hat{S}$ such that:

$$\hat{S} = p_{Stra} S_{Stra} + p_{Disp} S_{Disp} + p_{Int} S_{Int}$$

Inputs and Outputs of the Various Neural or Expert Models Forming the Hydrodynamic Model Whatever the neural model considered, the input data result from:
  geometrical data: diameter of the pipe, roughness, inclination, etc.,
  data describing the characteristics of the fluid: density of the phases, viscosity of the phases, etc.,
  data characterizing the mixture: gas fraction, gas/liquid surface tension, etc.,
  linear or non-linear combinations of these inputs,
  and also simplified models, continuous or not, containing information on the physics of the mixture.

Each model produces for example at the output the hydrodynamic behaviour of the effluents, and notably the flow regime. It evaluates and delivers at two main outputs hydrodynamic data in the part of the pipe where the flow regime is to be determined, the velocity difference dV between gas and liquid for example, the linear pressure drop $\partial P/\partial x$ or the fraction $\beta(\beta \in [0; 1])$ of flow of the regime processed thereby. Other quantities qualifying the flow regime can be calculated from these two outputs.

The outputs provided by the experts are essentially the velocity differences between the phases, under the assumption of a certain flow regime (for example, the Stratified expert delivers the estimation of the velocity difference between the phases under the assumption of a stratified flow).

The outputs provided by the probability network are the probability of belonging to each flow regime processed by the expert networks, knowing the inputs.

Structure of the Networks

Figure 2:
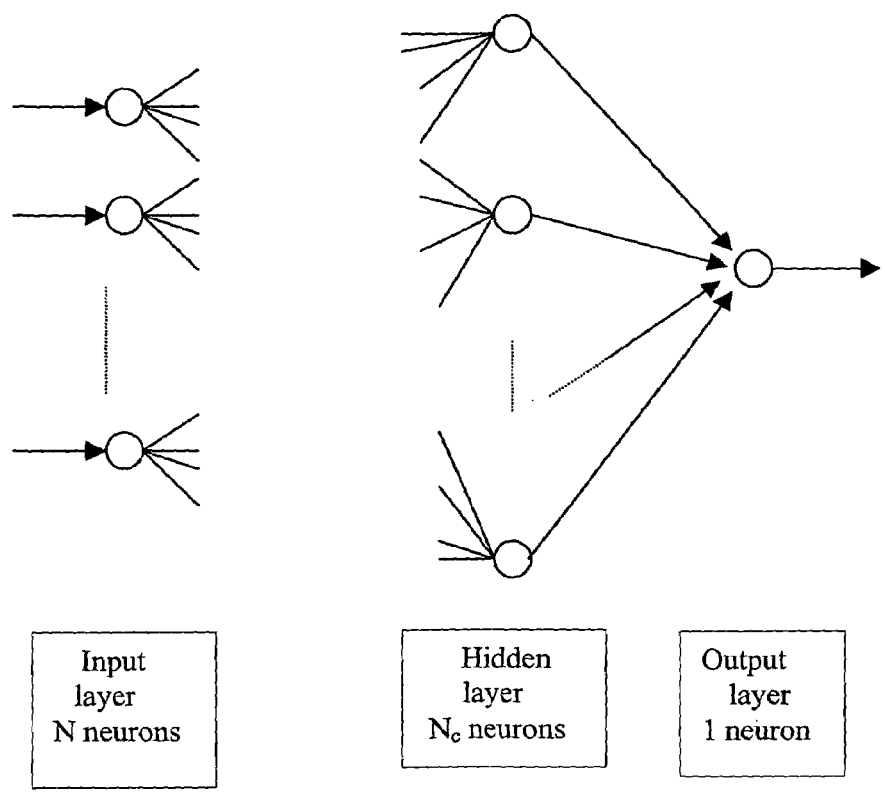
FIG. 2 shows an example of the structure of each neural network of FIG. 1.

The various neural or expert networks dedicated to the different flow regimes are preferably Multi Layer Perceptron (MLP) type networks well-known to the man skilled in the art, generally estimating a hydrodynamic quantity. They comprise each (FIG. 2) an input layer consisting of a certain number $N_i$ of neurons corresponding to the $N_i$ input data of the complete physical model, an output layer of a neuron for example corresponding to the parameter sought (dV, $\partial P/\partial x$ or $\beta$), and at least one intermediate layer, referred to as hidden layer, whose number of neurons $N_c$ is optimized. The number of hidden layers and the number of neurons which constitute them are determined from the network learning and validation results. The network is totally connected. The non-linearity of this network is obtained by either a sigmoid activation function governing the behaviour of the neurons in the hidden layer, or by the identity function or the softmax function for the output layer.

The neural networks comprise an input layer, one or two hidden layers and an output layer. The activation functions of the various neurons, well-known to the man skilled in the art, are either the sigmoid function (for the hidden layers), or the identity function or the softmax function (for the output layers).

Learning

The weights of each network or expert are determined at the end of a learning stage; during this stage, the networks are supplied with a set of data forming their learning base, and the configuration and the weights of the network are optimized by minimizing errors observed for all the samples of the base, between the output data resulting from network calculation and the data expected at the output, given by the base. The errors can be the absolute errors between the input and output quantities or the relative errors, according to the performance desired for the network. The generalization capacities of the network are then tested from its capacity to properly calculate the two outputs for inputs that are unknown thereto.

The databases used are of different natures:

for estimation of the velocity difference dV or of the pressure drop, each base contains pairs of input/output values, each output value being the desired value of the estimated quantity in the case of the flow regime processed by the dedicated network, for probability estimation, the desired output is a vector of magnitude equal to the number $N_{flows}$ of flow regimes considered (in the example of FIG. 1, the vector is of dimension 3); this vector contains ($N_{flows}$−1) zero values, and a value equal to 1, which corresponds to the probability for the fluid flow regime in the pipe to correspond to the flow regime processed by the dedicated neural network.

In the above example, we have considered three different flow regimes: stratified, intermittent and dispersed. This is in no way limitative. In cases where more detailed data is available, allowing to make distinctions within a single flow regime, for example to separate wavy stratified from smooth stratified within the stratified flow regime, specific experts modelling each one of these subregimes are preferably created.

Results

By implementing such modelling, we obtain a continuous and infinitely derivable transient hydrodynamic model which carries out real-time calculation of the main hydrodynamic quantities characterizing the flow. The probability estimation function allows to create an overall hydrodynamic law from the different flow laws modelled by the various dedicated neural models. The transition between two flow laws is more or less steep (more or less great derivative) depending on the precision given to the probability estimation, but it is continuous, which eliminates possible uncertainties in the model results related to the existence of discontinuities. The overall model is suited for either use independently of any other module or integration in a complete model.

The invention claimed is:

1. A method intended for real-time modelling of the hydrodynamic behaviour of a multiphase fluid flow in transient phase in a pipe, considering fixed operating conditions concerning a certain number of determined structure parameters relative to the pipe and a set of determined physical quantities, with fixed variation ranges for said parameters and said physical quantities, by neural networks with inputs for structure parameters and physical quantities, and outputs where results necessary for estimation of the hydrodynamic behaviour are available, and at least one intermediate layer, the neural networks being determined iteratively so as to adjust to the values of a learning base with predetermined tables connecting different values obtained for the output data to the corresponding values of the input data, characterized in that it comprises:

constructing several neural networks ($E_{Stra}$, $E_{Disp}$, $E_{Int}$) respectively dedicated to different fluid flow regimes, constructing a probability neural network ($RN_{Proba}$) suited to evaluate at all times the probabilities for the flow in the pipe to correspond respectively to the various flow regimes, and combining the results provided by the various neural networks weighted by said probabilities.

2. A method as claimed in claim 1, characterized in that at least three neural networks respectively dedicated to the stratified flow regime, the dispersed flow regime and the intermittent flow regime are constructed, the probabilities for the fluid flow in the pipe to correspond respectively to the three flow regimes are evaluated and the results at the outputs of the three dedicated neural networks are linearly combined by weighting them by said probabilities.

3. A method as claimed in claim 1, characterized in that, when the available database is sufficiently detailed to distinguish subregimes within a single flow regime, a probability neural network ($RN_{Proba}$) suited to evaluate at any time the probabilities for the flow in the pipe to correspond respectively to the various flow subregimes distinguished in the various flow regimes is constructed and the results provided by the various neural networks are combined by weighting them by said probabilities.

4. A method as claimed in claim 2, characterized in that, when the available database is sufficiently detailed to distinguish subregimes within a single flow regime, a probability neural network ($RN_{Proba}$) suited to evaluate at any time the probabilities for the flow in the pipe to correspond respectively to the various flow subregimes distinguished in the various flow regimes is constructed and the results provided by the various neural networks are combined by weighting them by said probabilities.

* * * * *